United States Patent
Kobayashi et al.

(10) Patent No.: US 11,267,567 B2
(45) Date of Patent: Mar. 8, 2022

(54) ROTOR BLADE FOR AIRCRAFT

(71) Applicant: SUBARU CORPORATION, Tokyo (JP)

(72) Inventors: Wataru Kobayashi, Tokyo (JP); Hokuto Yamane, Tokyo (JP); Hirotaka Hayashi, Tokyo (JP); Hiroshi Taguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 451 days.

(21) Appl. No.: 16/435,862

(22) Filed: Jun. 10, 2019

(65) Prior Publication Data

US 2020/0039640 A1 Feb. 6, 2020

(30) Foreign Application Priority Data

Aug. 6, 2018 (JP) .............................. JP2018-147814

(51) Int. Cl.
*B64C 27/46* (2006.01)
*B64C 27/473* (2006.01)
*B64C 23/06* (2006.01)
*F04D 29/38* (2006.01)
*F04D 29/66* (2006.01)

(52) U.S. Cl.
CPC .......... *B64C 27/463* (2013.01); *B64C 23/069* (2017.05); *B64C 27/473* (2013.01); *F04D 29/384* (2013.01); *F04D 29/667* (2013.01)

(58) Field of Classification Search
CPC ... B64C 23/069; B64C 27/463; B64C 27/473; F04D 29/667; F04D 29/384
See application file for complete search history.

(56) References Cited

U.S. PATENT DOCUMENTS

| | | | |
|---|---|---|---|
| 4,046,336 A * | 9/1977 | Tangier | B64C 23/069 244/198 |
| 6,168,383 B1 * | 1/2001 | Shimizu | B64C 27/463 415/119 |
| 6,467,732 B2 * | 10/2002 | Tsukahara | B64C 27/463 244/17.11 |
| 2001/0023907 A1 | 9/2001 | Tsukahara et al. | |
| 2005/0265850 A1 * | 12/2005 | Ota | B64C 27/463 416/223 R |

FOREIGN PATENT DOCUMENTS

| | | |
|---|---|---|
| JP | 10-316098 A | 12/1998 |
| JP | 2001-233295 A | 8/2001 |
| JP | 2002-284099 A | 10/2002 |

* cited by examiner

*Primary Examiner* — Richard A Edgar
(74) *Attorney, Agent, or Firm* — Troutman Pepper Hamilton Sanders LLP

(57) ABSTRACT

A rotor blade for an aircraft includes first and second blade tips, a blade body, and a vortex-generating blade. The blade body has an end forming the first blade tip of the rotor blade and an airfoil section configured such that during rotation, pressure acting on a lower surface of the blade body is greater than pressure acting on an upper surface of the blade body. The vortex-generating blade is disposed at an end of the rotor blade and forms the second blade tip. The vortex-generating blade also has an airfoil section configured such that during rotation, pressure acting on a lower surface of the vortex-generating blade is smaller than pressure acting on an upper surface of the vortex-generating blade.

18 Claims, 3 Drawing Sheets

ROTOR BLADE FOR AIRCRAFT

CROSS-REFERENCE TO RELATED APPLICATIONS

The present application claims priority from Japanese Patent Application No. 2018-147814 filed on Aug. 6, 2018, the entire contents of which are hereby incorporated by reference.

BACKGROUND

The disclosure relates to a rotor blade for an aircraft, an aircraft, and a noise reduction method for an aircraft.

SUMMARY

An aspect of the disclosure provides a rotor blade for an aircraft. The rotor blade includes first and second blade tips, a blade body, and a vortex-generating blade. The blade body has an end forming the first blade tip of the rotor blade and an airfoil section configured such that during rotation, pressure acting on a lower surface of the blade body is greater than pressure acting on an upper surface of the blade body. The vortex-generating blade is disposed at an end of the rotor blade and forms the second blade tip. The vortex-generating blade has an airfoil section configured such that during rotation, pressure acting on a lower surface of the vortex-generating blade is smaller than pressure acting on an upper surface f the vortex-generating blade.

An aspect of the disclosure provides an aircraft including a rotor formed of rotor blades, each of which is the rotor blade.

An aspect of the disclosure provides a noise reduction method of an aircraft. The method includes providing a rotor blade for the aircraft. The rotor blade has a first blade tip at an end of the rotor blade, and the first blade tip has such an airfoil section that during rotation, pressure acting on a lower surface of the first blade tip is greater than pressure acting on an upper surface of the first blade tip. The method further includes disposing a vortex-generating second blade tip, which is different from the first blade tip, at the end of the rotor blade. The second blade tip has such an airfoil section that during rotation, pressure acting on a lower surface of the second blade tip is smaller than pressure acting on an upper surface of the second blade tip. The vortex-generating second blade tip is disposed in such a manner that a first vortex generated at the first blade tip is weakened by a second vortex generated at the second blade tip, the second vortex rotating oppositely to the first vortex.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
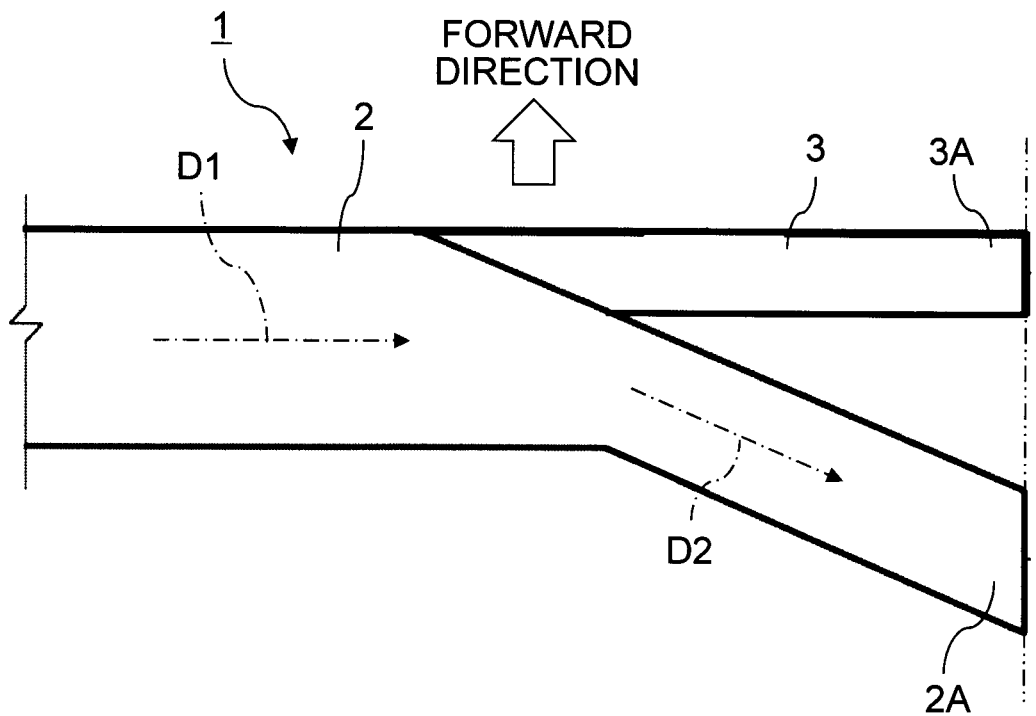
FIG. 1 is a top view illustrating a structure of a rotor blade for an aircraft according to an embodiment of the disclosure.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. One type of noise to be reduced in a rotary-wing aircraft is blade-vortex interaction (BVI) noise. The BVI noise is generated by interference between a vortex generated at the tip of a preceding rotor blade and a rotor blade that follows the preceding blade.

A known technique to reduce the BVI noise of a rotary-wing aircraft is to provide a front wing and a rear wing at the tip of each rotor blade so as to cause a vortex generated by the front wing and a vortex generated by the rear wing to interfere with each other and thereby weaken the vortexes. See, for example, Japanese Unexamined Patent Application Publication (JP-A) No. 2001-233295, No. 2002-284099, and No. H10-316098.

It is desirable to further reduce the BVI noise of an aircraft.

Configuration and Function

Figure 2:
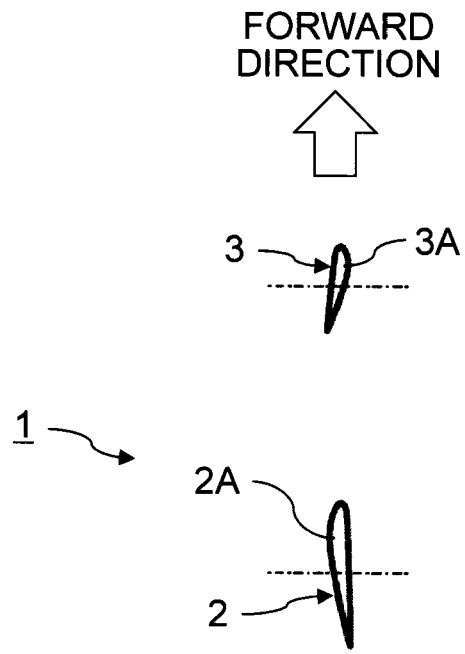
FIG. 2 is a right side view illustrating blade tips of the rotor blade of FIG. 1.

FIG. 1 is a top view illustrating a structure of a rotor blade for an aircraft according to an embodiment of the disclosure. FIG. 2 is a right side view illustrating blade tips of the rotor blade of FIG. 1.

The rotor blade 1 for an aircraft is a blade configured to reduce BVI noise by generating, at blade tips, vortexes with directions of rotation being opposite to each other. The rotor blade 1 includes a blade body 2 and a sub-blade 3 provided therewith.

The blade body 2 is a blade on which lift is produced for the aircraft. Accordingly, the blade body 2 has such an airfoil section that during rotation, the pressure acting on the lower surface of the blade body 2 becomes greater than the pressure acting on the upper surface thereof. An end of the blade body 2 is formed as a first blade tip 2A of the rotor blade 1. As the rotor blade 1 rotates, the first blade tip 2A generates a vortex.

The sub-blade 3 is a blade for generating a vortex and serves to reduce the BVI noise. The sub-blade 3 is provided at an end of the rotor blade 1 and has a second blade tip 3A. The sub-blade 3 has such an airfoil section that during rotation, the pressure acting on the upper surface thereof becomes greater than the pressure acting on the lower surface. In other words, the sub-blade 3 has a blade profile (i.e., cross section of the blade) that is the inverse of a typical blade profile for producing lift as does the blade body 2. Accordingly, the second blade tip 3A of the sub-blade 3 generates a second vortex having a direction of rotation opposite to that of a first vortex generated by the first blade tip 2A of the blade body 2.

Figure 3:
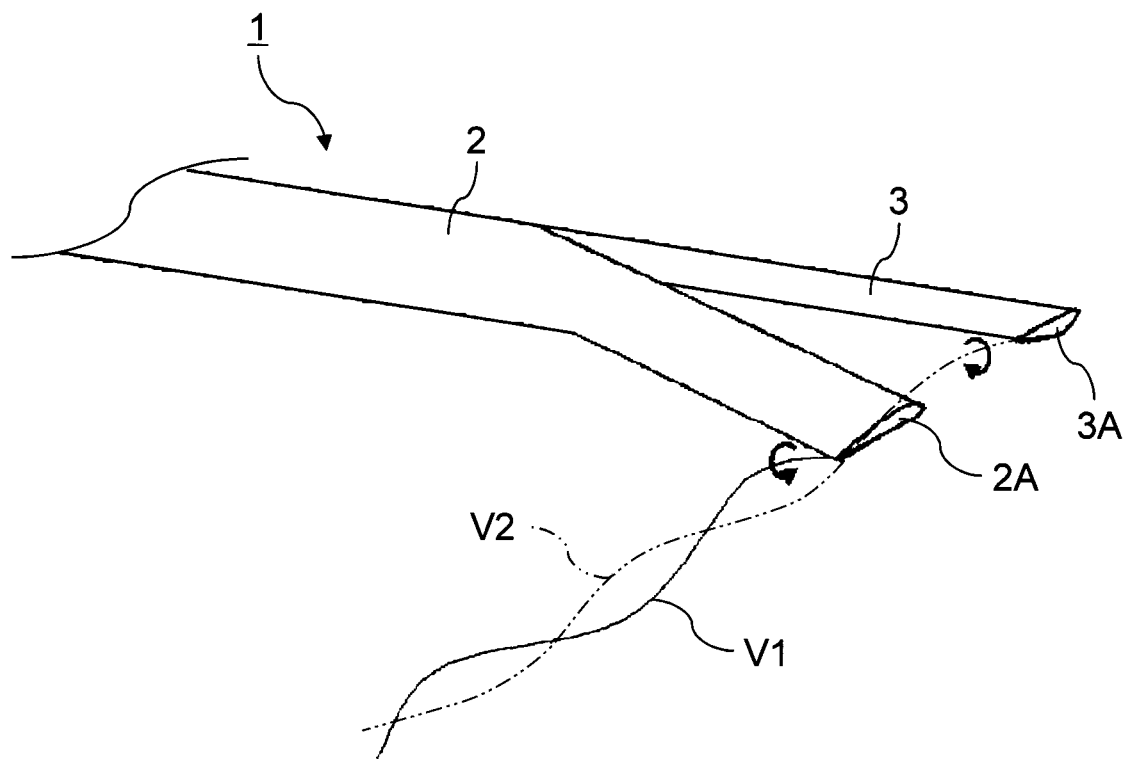
FIG. 3 is a perspective view illustrating the rotor blade of FIG. 1 to explain the principle of BVI noise reduction by the rotor blade.
Figure 4:
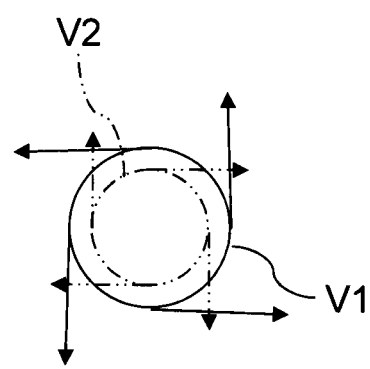
FIG. 4 illustrates a direction of rotation of a first vortex generated at a first blade tip of a blade body illustrated in FIG. 3 and a direction of rotation of a second vortex generated at a second blade tip of a sub-blade.

FIG. 3 is a perspective view illustrating the rotor blade 1 of FIG. 1 to explain the principle of BVI noise reduction by the rotor blade 1. FIG. 4 illustrates a direction of rotation of a first vortex V1 generated at the first blade tip 2A of the blade body 2 illustrated in FIG. 3 and also a direction of rotation of a second vortex V2 generated at the second blade tip 3A of the sub-blade 3.

As illustrated in FIG. 3, the second blade tip 3A of the sub-blade 3 that generates a vortex is provided at the blade tip of the rotor blade 1 separately from the first blade tip 2A of the blade body 2. The first blade tip 2A has a typical airfoil section such that during rotation, the pressure acting on the lower surface thereof becomes greater than the pressure acting on the upper surface, whereas the second blade tip 3A has such an airfoil section that during rotation, the pressure acting on the upper surface thereof becomes greater than the pressure acting on the lower surface. At the tip of the rotor blade 1, the first blade tip 2A generates a first vortex V1, and the second blade tip 3A generates a second vortex V2.

As illustrated in FIG. 2, the blade profile of the second blade tip 3A that generates the second vortex V2 has the vertically inverted shape of a typical blade profile. Accordingly, as illustrated in FIG. 4, the second vortex V2 rotates in a direction opposite to the first vortex V1 generated at the first blade tip 2A having a typical airfoil section. Thus, the second vortex V2 can weaken the first vortex V1. In other words, the vortex generated at the blade tip of the rotor blade 1 becomes weak due to the first vortex V1 and the second vortex V2 being superposed on each other. This can reduce the BVI noise generated by interference between a vortex generated at the tip of a preceding rotor blade 1 and a rotor blade that follows the preceding blade.

The sub-blade 3 having the vertically inverted blade profile produces negative lift during rotation. In view of reducing deterioration of lift-to-drag ratio of the entire rotor blade 1, it is desirable to minimize the negative lift produced by the sub-blade 3. However, an oppositely rotating second vortex V2 having a magnitude sufficient to weaken the first vortex V1 is to be generated at the second blade tip 3A of the sub-blade 3.

In view of controlling the lift reduction of the entire rotor blade 1, it is desirable that the length of the sub-blade 3 be 3% or more to 10% or less of the length of the rotor blade 1. It is desirable that the chord length of second blade tip 3A of the sub-blade 3 be shorter than the chord length of first blade tip 2A of the blade body 2.

Moreover, the sub-blade 3 is desirably disposed at a position in front of the blade body 2 in the forward direction in which the rotor blade 1 moves. By eliminating an obstruction in front of the sub-blade 3 except for a preceding rotor blade 1, the sub-blade 3 having a relatively short chord length can generate the second vortex V2 having a sufficient intensity as the rotor blade 1 moves forward.

To weaken the first vortex V1 by using the second vortex V2, as illustrated in an example of FIG. 4, it is particularly appropriate to generate the first vortex V1 and the second vortex V2 in such a manner that the center of the first vortex V1 is aligned with the center of the second vortex V2 on the same straight line. In view of reducing the BVI noise, it is appropriate that the blade body 2 and the sub-blade 3 are shaped and arranged in such a manner that the end faces of the first blade tip 2A and the second blade tip 3A are positioned, as illustrated in FIG. 1, on the same straight line parallel with the forward direction of the rotor blade 1.

In addition, in view of reducing the BVI noise, it is also appropriate to reduce the intensity of the first vortex V1 that causes the BVI noise. For this purpose, the chord length of the first blade tip 2A of the blade body 2 may be made shorter than the chord length of the blade body 2 measured at a position where the sub-blade 3 is not formed in front of the blade body 2 in the forward direction of the rotor blade 1.

Furthermore, it is appropriate in view of improving the aerodynamic performance that the first blade tip 2A of the blade body 2, which is the blade tip of the rotor blade 1 for producing the lift, be swept backward. Accordingly, the longitudinal direction D2 of the blade body 2 at a portion where the sub-blade 3 is disposed in front of the blade body 2 in the forward direction of the rotor blade 1 may be inclined in a direction opposite to the forward direction of the rotor blade 1 with respect to the longitudinal direction D1 of the blade body 2 at a portion where the sub-blade 3 is not disposed in front of the blade body 2 in the forward direction of the rotor blade 1. The blade body 2 can be thereby formed into a shape desirable in aerodynamic performance. Thus, disposing the sub-blade 3 in front of the blade body 2 provides an advantageous effect that the first blade tip 2A of the blade body 2 can be formed into a shape desirable in aerodynamic performance.

Note that two or more sub-blades 3 may be disposed at the blade body 2. The chord length of the blade body 2 may be reduced stepwise at the first blade tip 2A as illustrated in an example in JP-A No. 2001-233295. In other words, the rotor blade 1 may be configured to have a main wing tip and a sub-wing tip at the blade tip thereof, and the main wing tip may serve as the first blade tip 2A of the blade body 2 and the sub-wing tip may serve as the sub-blade 3.

The rotor blade 1 described above is configured to weaken a vortex by generating another vortex having an opposite rotation direction and by causing the vortexes to interfere with each other at the blade tip. A rotor included in an aircraft can be formed using rotor blades 1 having the above-described shape.

Figure 5:
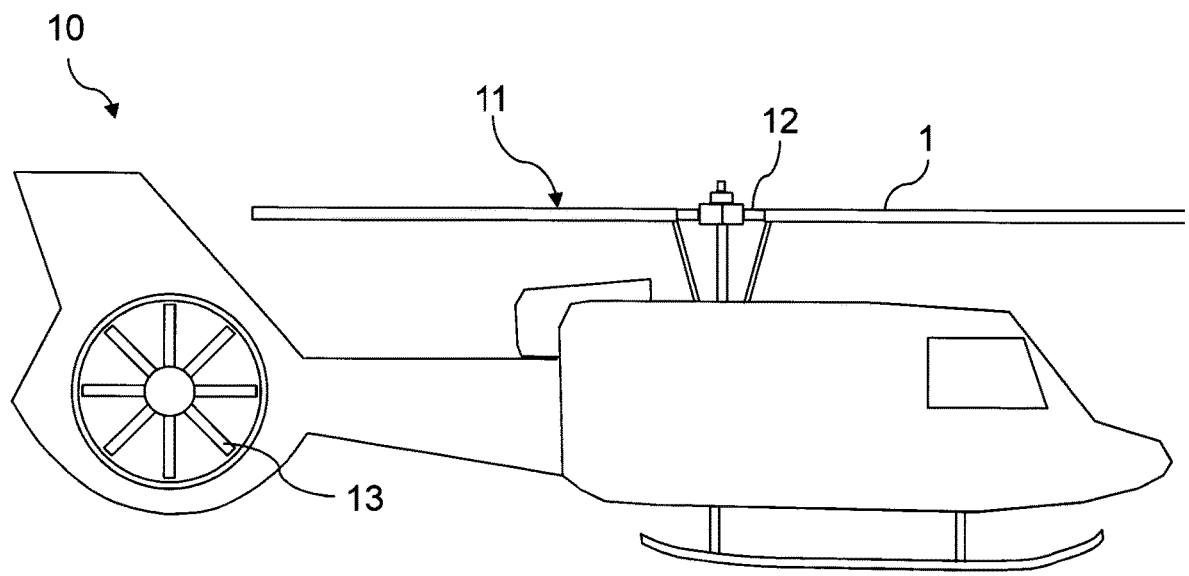
FIG. 5 illustrates examples of rotors that can be formed by using the rotor blade of FIG. 1.

FIG. 5 illustrates examples of rotors that can be formed using the rotor blades 1 of FIG. 1.

As illustrated in FIG. 5, a main rotor (rotary wing) 11 of a rotary-wing aircraft 10 can be formed of the rotor blades 1. In other words, the main rotor 11 of the rotary-wing aircraft 10 can be formed by attaching a plurality of the rotor blades 1 to a rotor head 12.

A tail rotor 13 of the rotary-wing aircraft 10 can be also formed of the above rotor blades 1. FIG. 5 illustrates an example of a tail rotor 13 formed as a ducted fan having a structure in which a fan is protected by an annular casing. The blades of a tail rotor 13 having a different structure can be also formed of the above rotor blades 1.

Figure 6:
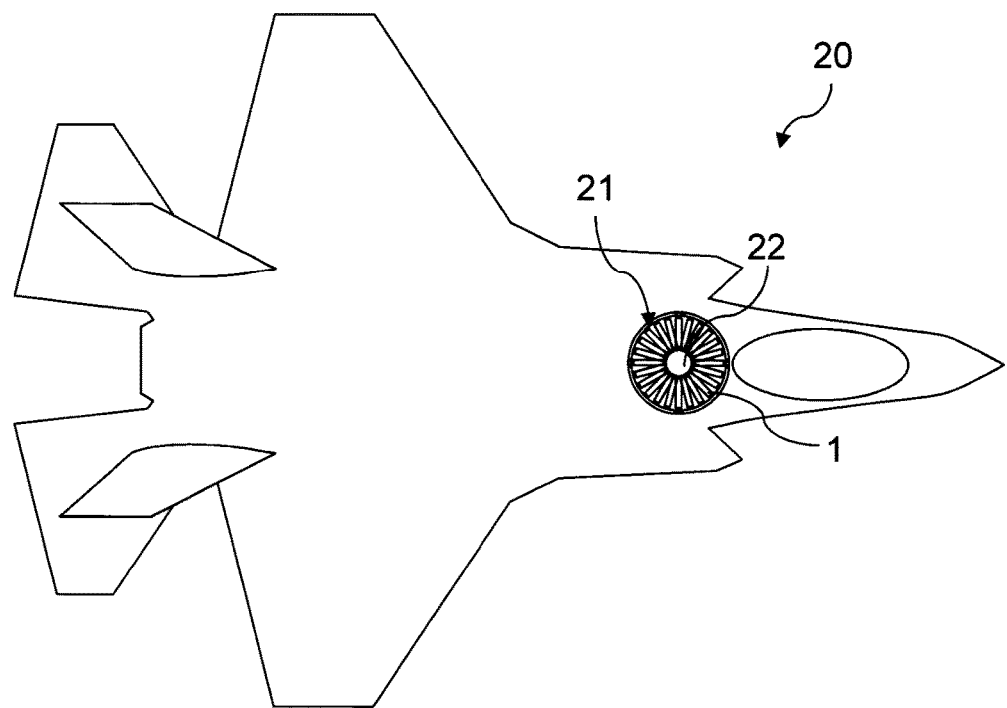
FIG. 6 illustrates another example of a rotor that can be formed by using the rotor blade of FIG. 1.

FIG. 6 illustrates another example of a rotor that can be formed using the rotor blades 1 illustrated in FIG. 1.

As illustrated in FIG. 6, a type of fixed-wing aircraft 20 includes a lift fan 21 that serves as a rotor (rotary wing) for producing lift. Blades of the lift fan 21 of the fixed-wing aircraft 20 can be formed as the rotor blades 1. In other words, the lift fan 21 of the fixed-wing aircraft 20 can be formed by radially attaching a plurality of the rotor blades 1 to a rotor shaft 22. Note that although FIG. 6 illustrates an example in which the lift fan 21 is disposed in the body of the fixed-wing aircraft 20, the lift fan 21 may be disposed in the main wing, and also in such a case, the lift fan 21 of the fixed-wing aircraft 20 can be formed of the above rotor blades 1.

Advantageous Effect

By using the rotor blade 1 for an aircraft, the aircraft including a rotor formed of the rotor blades 1, and the noise reduction method for the aircraft, a vortex generated at the first blade tip 2A formed at the end of the blade body 2 can be weakened by an oppositely rotating vortex generated at the second blade tip 3A formed at the end of the sub-blade 3. Thus, the BVI noise can be reduced.

Other Embodiments

A specific embodiment has been described. However, the embodiment described above is not intended to limit the scope of the disclosure. The new method and the new apparatus described herein can be implemented in various other forms. Forms of the method and apparatus described herein are subject to omission, replacement, and modification to the extent not departing from the gist of the disclosure. Such various other forms and modifications are to be included as such, or as equivalents thereof, in the scope of the disclosure set forth in the appended claims.

The invention claimed is:

1. A rotor blade for an aircraft, comprising:
    a first blade tip and a second blade tip;
    a blade body comprising an end forming the first blade tip of the rotor blade and an airfoil section configured such that during rotation, pressure acting on a lower surface of the blade body is greater than pressure acting on an upper surface thereof; and
    a vortex-generating blade disposed at an end of the rotor blade and forming the second blade tip, the vortex-generating blade comprising an airfoil section configured such that during rotation, pressure acting on a lower surface of the vortex-generating blade is smaller than pressure acting on an upper surface thereof.

2. The rotor blade for the aircraft according to claim 1, wherein the vortex-generating blade is disposed in front of the blade body in a direction in which the rotor blade moves.

3. The rotor blade for the aircraft according to claim 1, wherein
    the first blade tip and the second blade tip have respective end faces, and
    the blade body and the vortex-generating blade are shaped and arranged in such a manner that the respective end faces are positioned on a same straight line parallel with the direction in which the rotor blade moves.

4. The rotor blade for the aircraft according to claim 2, wherein
    the first blade tip and the second blade tip have respective end faces, and
    the blade body and the vortex-generating blade are shaped and arranged in such a manner that the respective end faces are positioned on a same straight line parallel with the direction in which the rotor blade moves.

5. The rotor blade for the aircraft according to claim 1, wherein a length of the vortex-generating blade is 3% or more and 10% or less of a length of the rotor blade.

6. The rotor blade for the aircraft according to claim 2, wherein a length of the vortex-generating blade is 3% or more and 10% or less of a length of the rotor blade.

7. The rotor blade for the aircraft according to claim 1, wherein a chord length of the second blade tip of the vortex-generating blade is shorter than a chord length of the first blade tip of the blade body.

8. The rotor blade for the aircraft according to claim 2, wherein a chord length of the second blade tip of the vortex-generating blade is shorter than a chord length of the first blade tip of the blade body.

9. The rotor blade for the aircraft according to claim 2, wherein a chord length of the first blade tip of the blade body is shorter than a chord length of the blade body measured at a position where the vortex-generating blade is not disposed in front of the blade body in the direction in which the rotor blade moves.

10. The rotor blade for the aircraft according to claim 2, wherein a longitudinal direction of the blade body at a portion where the vortex-generating blade is disposed in front of the blade body in the direction in which the rotor blade moves is inclined with respect to the longitudinal direction of the blade body at a portion where the vortex-generating blade is not disposed in front of the blade body in the direction in which the rotor blade moves.

11. The rotor blade for the aircraft according to claim 9, wherein a longitudinal direction of the blade body at a portion where the vortex-generating blade is disposed in front of the blade body in the direction in which the rotor blade moves is inclined with respect to the longitudinal direction of the blade body at a portion where the vortex-generating blade is not disposed in front of the blade body in the direction in which the rotor blade moves.

12. An aircraft, comprising a rotor formed of rotor blades, each of which is the rotor blade according to claim 1.

13. An aircraft, comprising a rotor formed of rotor blades, each of which is the rotor blade according to claim 2.

14. The aircraft according to claim 12, wherein the aircraft is a rotary-wing aircraft comprising a main rotor that is formed of the rotor blades.

15. The aircraft according to claim 13, wherein the aircraft is a rotary-wing aircraft comprising a main rotor that is formed of the rotor blades.

16. The aircraft according to claim 12, wherein the aircraft is a fixed-wing aircraft comprising a lift fan that is formed of the rotor blades.

17. The aircraft according to claim 13, wherein the aircraft is a fixed-wing aircraft comprising a lift fan that is formed of the rotor blades.

18. A noise reduction method of an aircraft, the method comprising:
    providing a rotor blade for the aircraft, the rotor blade comprising a first blade tip at an end thereof, the first blade tip having such an airfoil section that during rotation, pressure acting on a lower surface of the first blade tip is greater than pressure acting on an upper surface thereof;
    disposing a vortex-generating second blade tip, which is different from the first blade tip, at the end of the rotor blade, the second blade tip having such an airfoil section that during rotation, pressure acting on a lower surface of the second blade tip is smaller than pressure acting on an upper surface thereof, in such a manner that a first vortex generated at the first blade tip is weakened by a second vortex generated at the second blade tip, the second vortex rotating oppositely to the first vortex.

\* \* \* \* \*